United States Patent
Paasovaara et al.

(10) Patent No.: US 9,823,707 B2
(45) Date of Patent: Nov. 21, 2017

(54) CONTORTION OF AN ELECTRONIC APPARATUS

(75) Inventors: Pii Susanna Paasovaara, Lempäälä (FI); Johan Kildal, Helsinki (FI); Erika Reponen, Tampere (FI)

(73) Assignee: Nokia Technologies Oy, Espoo (FI)

(*) Notice: Subject to any disclaimer, the term of this patent is extended or adjusted under 35 U.S.C. 154(b) by 210 days.

(21) Appl. No.: 13/357,809

(22) Filed: Jan. 25, 2012

(65) Prior Publication Data

US 2013/0187864 A1 Jul. 25, 2013

(51) Int. Cl.
*G06F 3/03* (2006.01)
*G06F 1/16* (2006.01)
*G06F 3/0338* (2013.01)
*G06F 3/041* (2006.01)

(52) U.S. Cl.
CPC .............. *G06F 1/1684* (2013.01); *G06F 3/03* (2013.01); *G06F 3/0338* (2013.01); *G06F 3/0414* (2013.01)

(58) Field of Classification Search
None
See application file for complete search history.

(56) References Cited

U.S. PATENT DOCUMENTS

| | | |
|---|---|---|
| 1,410,366 A | 3/1922 | Buchman |
| 1,619,502 A | 3/1927 | Fox ................................. 16/358 |
| 2,311,470 A | 2/1943 | Ritter |
| 3,148,724 A | 9/1964 | Chieger |
| 3,297,077 A | 1/1967 | Garbus .......................... 160/118 |
| 3,324,930 A | 6/1967 | Colombo |
| 3,363,383 A | 1/1968 | La Barge |
| 3,570,579 A | 3/1971 | Matsushima |

(Continued)

FOREIGN PATENT DOCUMENTS

| | | |
|---|---|---|
| CN | 1598870 A | 3/2005 |
| CN | 1617614 A | 5/2005 |

(Continued)

OTHER PUBLICATIONS

Mina; *Samsung Unveils Flexible Android Smartphone*; http://www.androidauthority.com/samsung-unveils-flexible-android-smartphone-24933/ (8 pages).

(Continued)

*Primary Examiner* — Seokyun Moon
(74) *Attorney, Agent, or Firm* — Harrington & Smith

(57) ABSTRACT

An apparatus including: a body configured for resilient contortion from a neutral equilibrium shape by a user, the body having an exterior surface that resiliently contorts in response to user provision of a force, wherein the body defines, proximal to a perimeter of a face of the body, at least a first portion of an exterior surface of the apparatus and a second portion of an exterior surface of the apparatus that opposes the first portion across the face, wherein user provision of a force in a first direction results in a first contortion of the exterior surface and user provision of a force in a second direction, opposite to the first direction, results in a second contortion of the exterior surface; and electronic circuitry configured to provide consistent meaning across a plurality of different software applications for user provision of a force to the exterior surface.

22 Claims, 3 Drawing Sheets

(56) References Cited

U.S. PATENT DOCUMENTS

| | | | |
|---|---|---|---|
| 3,880,500 A | 4/1975 | Kojabashian | 359/847 |
| 4,344,475 A | 8/1982 | Frey | |
| 4,438,605 A | 3/1984 | DeLucia | 16/225 |
| 4,483,020 A | 11/1984 | Dunn | 2/2.5 |
| 4,716,698 A | 1/1988 | Wilson | |
| 4,762,020 A | 8/1988 | Schmidberger | |
| 4,785,565 A | 11/1988 | Kuffner | |
| 5,007,108 A | 4/1991 | Laberge et al. | 2/2 |
| 5,133,108 A | 7/1992 | Esnault | |
| 5,148,850 A | 9/1992 | Urbanick | |
| 5,176,463 A | 1/1993 | Kraus | 16/227 |
| 5,214,623 A | 5/1993 | Seager | 368/10 |
| 5,488,982 A | 2/1996 | Rejc | |
| 5,588,167 A | 12/1996 | Pahno et al. | 5/606 |
| 5,613,541 A | 3/1997 | Bradbury | 160/231.2 |
| 5,706,026 A | 1/1998 | Kent et al. | 345/156 |
| 5,771,489 A | 6/1998 | Snedeker | 2/12.5 |
| 5,795,430 A | 8/1998 | Beeteson et al. | 156/350 |
| 5,923,318 A | 7/1999 | Zhai et al. | 345/157 |
| 6,016,176 A | 1/2000 | Kim et al. | |
| 6,160,540 A | 12/2000 | Fishkin et al. | 345/184 |
| 6,378,172 B1 | 4/2002 | Schrage | 16/225 |
| 6,441,809 B2 | 8/2002 | Kent et al. | 345/177 |
| 6,556,189 B1 | 4/2003 | Takahata et al. | 345/173 |
| 6,557,177 B2 | 5/2003 | Hochmuth | 2/159 |
| 7,075,527 B2 | 7/2006 | Takagi et al. | 345/184 |
| 7,443,380 B2 | 10/2008 | Nozawa | 345/156 |
| 7,446,757 B2 | 11/2008 | Mochizuki | 345/168 |
| 7,456,823 B2 | 11/2008 | Poupyrev et al. | 345/173 |
| 8,194,399 B2 | 6/2012 | Ashcraft et al. | 361/679.05 |
| 8,380,327 B2 | 2/2013 | Park | 700/1 |
| 8,581,859 B2 | 11/2013 | Okumura et al. | |
| 8,619,021 B2 | 12/2013 | Hayton | 345/107 |
| 8,780,540 B2 | 7/2014 | Whitt, III et al. | 361/679.09 |
| 8,780,541 B2 | 7/2014 | Whitt, III et al. | 361/679.09 |
| 8,804,324 B2 | 8/2014 | Bohn | 345/1.1 |
| 8,929,085 B2 | 1/2015 | Franklin et al. | |
| 8,999,474 B2 | 4/2015 | Casteras | |
| 2001/0033275 A1 | 10/2001 | Kent et al. | 345/173 |
| 2002/0033798 A1 | 3/2002 | Nakamura et al. | 345/156 |
| 2002/0167495 A1 | 11/2002 | Quinn et al. | 345/173 |
| 2003/0043087 A1 | 3/2003 | Kim | 345/1.1 |
| 2003/0060269 A1 | 3/2003 | Paulsen et al. | |
| 2003/0144034 A1 | 7/2003 | Hack et al. | 455/566 |
| 2003/0147205 A1 | 8/2003 | Murphy et al. | 361/680 |
| 2003/0210801 A1 | 11/2003 | Naksen et al. | |
| 2003/0214485 A1 | 11/2003 | Roberts | 345/173 |
| 2003/0227441 A1 | 12/2003 | Hioki et al. | 345/156 |
| 2004/0008191 A1* | 1/2004 | Poupyrev et al. | 345/184 |
| 2004/0017355 A1 | 1/2004 | Shim | 345/156 |
| 2004/0035994 A1 | 2/2004 | Cho et al. | 248/276.1 |
| 2004/0046739 A1 | 3/2004 | Gettemy | 345/158 |
| 2004/0212588 A1 | 10/2004 | Moriyama | |
| 2004/0239631 A1 | 12/2004 | Gresham | |
| 2005/0051693 A1 | 3/2005 | Chu | 248/371 |
| 2005/0057527 A1 | 3/2005 | Takenaka et al. | 345/173 |
| 2005/0140646 A1 | 6/2005 | Nozawa | 345/156 |
| 2005/0162389 A1 | 7/2005 | Obermeyer et al. | 345/161 |
| 2005/0237308 A1 | 10/2005 | Autio et al. | 345/173 |
| 2006/0007151 A1 | 1/2006 | Ram | 345/163 |
| 2006/0077672 A1 | 4/2006 | Schaak | |
| 2006/0199999 A1 | 9/2006 | Ikeda et al. | |
| 2006/0238494 A1* | 10/2006 | Narayanaswami et al. | 345/156 |
| 2007/0040810 A1 | 2/2007 | Dowe et al. | 345/173 |
| 2007/0097014 A1 | 5/2007 | Solomon | |
| 2007/0154254 A1 | 7/2007 | Bevirt | 403/56 |
| 2007/0205997 A1 | 9/2007 | Lieshout et al. | 345/204 |
| 2007/0242033 A1 | 10/2007 | Cradick et al. | |
| 2007/0247422 A1 | 10/2007 | Vertegaal et al. | 345/156 |
| 2008/0018631 A1 | 1/2008 | Hioki et al. | 345/206 |
| 2008/0042940 A1 | 2/2008 | Hasegawa | 345/76 |
| 2008/0251662 A1 | 10/2008 | Desorbo et al. | |
| 2009/0058828 A1 | 3/2009 | Jiang et al. | 345/173 |
| 2009/0085866 A1 | 4/2009 | Sugahara | 345/156 |
| 2009/0088204 A1 | 4/2009 | Culbert et al. | 455/556.1 |
| 2009/0115734 A1 | 5/2009 | Frederiksson et al. | 345/173 |
| 2009/0184921 A1 | 7/2009 | Scott et al. | 345/156 |
| 2009/0219247 A1* | 9/2009 | Watanabe et al. | 345/157 |
| 2009/0237872 A1 | 9/2009 | Bemelmans et al. | 361/679.01 |
| 2009/0244013 A1 | 10/2009 | Eldershaw | 345/173 |
| 2009/0326833 A1 | 12/2009 | Ryhanen et al. | 702/33 |
| 2010/0011291 A1* | 1/2010 | Nurmi | 715/702 |
| 2010/0013939 A1 | 1/2010 | Ohno et al. | 348/208.5 |
| 2010/0056223 A1 | 3/2010 | Choi et al. | |
| 2010/0060548 A1 | 3/2010 | Choi et al. | 345/1.3 |
| 2010/0108828 A1 | 5/2010 | Yu et al. | |
| 2010/0120470 A1 | 5/2010 | Kim et al. | 455/566 |
| 2010/0134428 A1 | 6/2010 | Oh | |
| 2010/0141605 A1 | 6/2010 | Kang et al. | |
| 2010/0164888 A1* | 7/2010 | Okumura et al. | 345/173 |
| 2010/0228295 A1 | 9/2010 | Whitefield | |
| 2010/0238612 A1 | 9/2010 | Hsiao et al. | 361/679.01 |
| 2010/0263245 A1 | 10/2010 | Bowser | 40/517 |
| 2011/0007000 A1 | 1/2011 | Lim | |
| 2011/0018494 A1 | 1/2011 | Wong et al. | 345/1.3 |
| 2011/0057873 A1* | 3/2011 | Geissler et al. | 345/156 |
| 2011/0062703 A1 | 3/2011 | Lopez et al. | 285/129.1 |
| 2011/0080155 A1 | 4/2011 | Aldridge | 323/318 |
| 2011/0095999 A1 | 4/2011 | Hayton | 345/173 |
| 2011/0141053 A1 | 6/2011 | Bulea et al. | |
| 2011/0141069 A1 | 6/2011 | Hirakata et al. | |
| 2011/0167391 A1* | 7/2011 | Momeyer | G06F 1/1684 715/863 |
| 2011/0193771 A1* | 8/2011 | Chronqvist | 345/156 |
| 2011/0227822 A1 | 9/2011 | Shai | 345/156 |
| 2011/0241822 A1 | 10/2011 | Opran et al. | 340/4.31 |
| 2011/0298786 A1 | 12/2011 | Cho et al. | |
| 2012/0044620 A1 | 2/2012 | Song | 361/679.01 |
| 2012/0110784 A1 | 5/2012 | Hsu | |
| 2012/0162876 A1 | 6/2012 | Kim | 361/679.01 |
| 2012/0206375 A1* | 8/2012 | Fyke et al. | 345/173 |
| 2013/0083496 A1* | 4/2013 | Franklin | G06F 1/1626 361/749 |
| 2013/0120912 A1 | 5/2013 | Ladouceur | 361/679.01 |
| 2013/0178344 A1 | 7/2013 | Walsh et al. | |
| 2013/0187864 A1 | 7/2013 | Paasovaara et al. | |
| 2013/0194207 A1 | 8/2013 | Andrew et al. | |
| 2013/0197819 A1 | 8/2013 | Vanska et al. | |
| 2013/0286553 A1 | 10/2013 | Vanska et al. | 367/679.01 |
| 2013/0335929 A1 | 12/2013 | Cavallaro | 361/749 |
| 2014/0003006 A1 | 1/2014 | Ahn | 361/749 |

FOREIGN PATENT DOCUMENTS

| | | |
|---|---|---|
| CN | 101430601 A | 5/2009 |
| EP | 1657965 A2 | 5/2006 |
| EP | 1770965 A1 | 4/2007 |
| EP | 1829023 | 9/2007 |
| EP | 1830336 A1 | 9/2007 |
| EP | 1970886 A1 | 9/2008 |
| EP | 2166443 A2 | 3/2010 |
| EP | 2202624 A2 | 6/2010 |
| EP | 2315186 A2 | 4/2011 |
| EP | 2508960 A2 | 10/2012 |
| GB | 2456512 A | 7/2009 |
| JP | 2002278515 A | 9/2002 |
| JP | 2003015795 A | 1/2003 |
| JP | 2004046792 A | 2/2004 |
| JP | 2004192241 A | 7/2004 |
| JP | 2008152426 A | 7/2008 |
| KR | 2006-0134130 A | 12/2006 |
| KR | 20090006718 A | 1/2009 |
| KR | 20090006807 A | 1/2009 |
| KR | 2009-001161 A | 2/2009 |
| TW | 200404248 A | 3/2004 |
| WO | WO 00/60438 A | 10/2000 |
| WO | WO-2005/093548 A1 | 10/2005 |
| WO | 2006014230 A2 | 2/2006 |
| WO | 2008150600 A1 | 12/2008 |
| WO | WO 2009/050107 A2 | 4/2009 |
| WO | WO-2010/041227 A1 | 4/2010 |
| WO | WO 2011/117681 A1 | 9/2011 |

(56) References Cited

FOREIGN PATENT DOCUMENTS

| WO | WO 2011/144972 A1 | 9/2011 |
| WO | WO 2011117681 A1 | 9/2011 |
| WO | WO-2013/160737 A1 | 10/2013 |

OTHER PUBLICATIONS

Smith, Matt; *Nokia's kinetic future: flexible screens and a twisted interface*; Oct. 26, 2012; http://www.engadget.com/2011/10/26/nokias-kinetic-future-flexible-screens-and-a-twisted-interface/ (4 pages).

"How Users Manipulate Deformable Displays as Input Devices", Sang-Su Lee et al Apr. 10-15, 2010, (pp. 1647-1656).

"Gummi: A bendable computer", Dr Ivan Poupyrev—http://ivanpoupyrev.com/projects/gummi.php, (1994-2012), (7 pages).

"Mrata Tactile controller TV remote hands-on (video)", Zach Honig—http://www.engadget.com2011/10/05/murata-tactile-controller-tv-remote-ands-on-vi . . . , (2012), (8 pages).

"Press release: revolutionary new paper computer shows flexible future for smartphones and tablets", http://www.hml.queensu.ca/paperphone, (2012), (2 pages).

Lahey, Byron, et al., "PaperPhone: Understanding the Use of Bend Gestures in Mobile Devices with Flexible Electronic Paper Displays", CHI 2011-Session: flexible Grips & Gestures, May 7-12, 2011, pp. 1303-1312.

Tajika, Taichi et al.; "Intuitive Page-Turning Interface of E-Books on Flexible E-Paper Based on User Studies"; 2008; Proceedings of the 16th ACM International Conference on Multimedia MM '08; pp. 793-796.

Melanson, Donald; "Nokia patent application points to flexible phone displays"; Jan. 19, 2010; http://www.engadget.com/2010/01/19/nokia-patent-application-points-to-flexible-phone-displays/.

Watanabe, Jun-ichiro, et al., "Booksheet: Bendable Device for Browsing Content Using the Metaphor of Leafing Through the Pages", Sep. 21-24, 2008, pp. 360-369.

\* cited by examiner

CONTORTION OF AN ELECTRONIC APPARATUS

FIELD OF THE INVENTION

Embodiments of the present invention relate to contortion of an electronic apparatus. In particular, they relate to controlling an apparatus by contorting the apparatus.

BACKGROUND TO THE INVENTION

There are various different ways in which a user can control an apparatus via a man-machine-interface (MMI). For example, the apparatus may comprise a cursor control device such as a mouse or trackball. For example, the apparatus may have devices that enable tactile actuation such as keys, touch screens etc. For example, the apparatus may have devices that enable audio actuation such as a microphone and voice recognition circuitry.

BRIEF DESCRIPTION OF VARIOUS EMBODIMENTS OF THE INVENTION

According to some but not necessarily all examples there may be provided an apparatus comprising: a body configured for resilient contortion from a neutral equilibrium shape by a user, the body having an exterior surface that resiliently contorts in response to user provision of a force, wherein the body defines, proximal to a perimeter of a face of the body, at least a first portion of an exterior surface of the apparatus and a second portion of an exterior surface of the apparatus that opposes the first portion across the face, wherein user provision of a force in a first direction results in a first contortion of the exterior surface and user provision of a force in a second direction, opposite to the first direction, results in a second contortion of the exterior surface; and electronic circuitry including at least a processor configured to provide consistent meaning across a plurality of different software applications for user provision of a force in the first direction to the first portion of the exterior surface and to provide consistent meaning across the plurality of software applications for user provision of a force in the first direction to the second portion of the exterior surface.

According to some but not necessarily all examples there may be provided an apparatus comprising: a body configured for resilient contortion from a neutral equilibrium shape by a user, the body having an exterior surface that resiliently contorts in response to user provision of a force but contorts differentially dependent upon which side of the body the force is provided; wherein the body defines, proximal to a first portion of a perimeter of a first side of a face of the body, first portions of an exterior surface of the apparatus and defines, proximal to a second portion of the perimeter of a second side of the face of the body, at least a second portion of an exterior surface of the apparatus; wherein user provision of a force in a first direction to any of the first portions results in a first contortion of the exterior surface to a different extent than user provision of the same force in the first direction to the second portion; and electronic circuitry including at least a processor configured to provide a first function in response to user provision of a force in a first direction to the first portions and to provide a second function in response to user provision of the same force in the first direction to the second portion.

According to some but not necessarily all examples there may be provided an apparatus comprising: a body configured for resilient contortion from a neutral equilibrium shape, the body having an exterior surface that resiliently contorts in response to provision of a force, wherein the body defines, proximal to a perimeter of a face of the body, at least a first portion of an exterior surface of the apparatus and a second portion of an exterior surface of the apparatus that opposes the first portion across the face, wherein provision of a force in a first direction results in a first contortion of the exterior surface and provision of a force in a second direction, opposite to the first direction, results in a second contortion of the exterior surface; and electronic circuitry including at least a processor configured to provide consistent meaning across a plurality of different software applications for provision of a force in the first direction to the first portion of the exterior surface and to provide consistent meaning across the plurality of software applications for provision of a force in the first direction to the second portion of the exterior surface.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
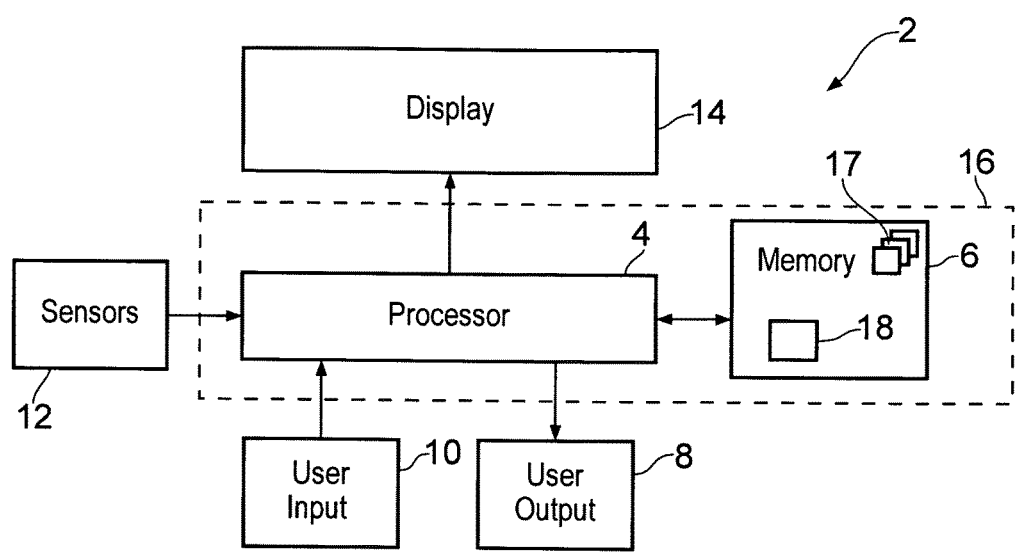
FIG. 1 schematically illustrates an example of an apparatus 2 and its functional components.

The Figures illustrate an apparatus 2. The apparatus 2 may comprise: a body 20 configured for resilient contortion from a neutral equilibrium shape by a user, the body 20 having an exterior surface 28 that resiliently contorts in response to user provision of a force F. The body defines, proximal to a perimeter 22 of a face 26 of the body 20, at least a first portion (e.g. 24B) of an exterior surface 28 of the apparatus 2 and a second portion (e.g. 24F) of the exterior surface 28 of the apparatus 2 that opposes the first portion across the face 26. User provision of a force 23A in a first direction results in a first contortion 25A of the exterior surface 28 and user provision of a force 23B in a second direction, opposite to the first direction, results in a second contortion 25B of the exterior surface 28. The apparatus 2 comprises electronic circuitry 16 including at least a processor 4 configured to provide consistent meaning across a plurality of different software applications 17 for user provision of a force 23A in the first direction to the first portion (e.g. 24B) of the exterior surface 28 and to provide consistent meaning across the plurality of software applications 17 for user provision of a force 23A in the first direction to the second portion (e.g. 24F) of the exterior surface 28.

As consistent meaning is provided for similar user contortions at similar portions across different applications, the apparatus 2 is easier to use. Consistent meaning implies a consistent effect in the context of the application such as, for example, consistent affirmation of an available option, consistent negation of an available option; or a consistent navigation command.

Contortion is the deformation of the body 20 by twisting and/or bending. The extent of distortion facilitated by the body 20 depends upon implementation. Resilient contortion implies that the body stays in its contorted state while held in that state and returns to its equilibrium shape when released.

An apparatus 2 may be a hand-portable electronic apparatus 2. It may, for example, be an apparatus sized to fit into a jacket pocket or be carried in the palm of a user's hand. The apparatus 2 may be a personal user device such as a mobile cellular telephone, a personal music player, a personal video player, a personal handheld computer, a personal digital assistant or similar.

FIG. 1 schematically illustrates an example of the apparatus 2 and its functional components. In this example, the apparatus 2 not only comprises a display 14 and electronic circuitry 16 but also comprises sensors 12, a user input 10 and a user output 8.

The electronic circuitry 16 is configured to control the display 14 and user output 8. The electronic circuitry 16 is configured to receive input from the user input 10 and from the sensors 12.

The sensors 12 may be configured and positioned to detect contortions and other deformations of the body 20 by a user. The sensors 12 are configured to detect and enable disambiguation of different contortions of the body 20.

To disambiguate between contortions of different portions 24 is may be necessary to identify which portion(s) is/are most contorted or which portion(s) were first contorted. The sensors 12 may be configured to detect an extent and/or timing of contortion at a portion.

Contortion may include deformations such as bend, torsion, stretch, compression or applied tension such as compression, stretch, shearing, torque. The sensors 12 may, for example, include strain gauges, and force and touch sensors (capacitive, resistive, piezoelectric . . . ).

The electronic circuitry 16 receives an input from the sensors 12, identifies the detected contortion (and perhaps its extent) and controls the operation of the apparatus 2 in dependence upon the detected contortion (and perhaps its extent).

The user input 10 may comprise a device for tactile user input such as a touch screen for the display 14 or a key or keypad and/or it may comprise a device for audio user input such as a microphone.

The user output 10 may comprise a device for visual user input such as lights and/or it may comprise a device for audio user output such as a loudspeaker or headphone socket.

The electronic circuitry 16 may be implemented using instructions that enable hardware functionality, for example, by using executable computer program instructions in a general-purpose or special-purpose processor that may be stored on a computer readable storage medium (disk, memory etc) 6 to be executed by such a processor 4.

In the illustrated example, the electronic circuitry 16 comprises a processor 4 and a memory 6. The processor 4 is configured to read from and write to the memory 6. The processor 4 may also comprise an output interface via which data and/or commands are output by the processor 4 and an input interface via which data and/or commands are input to the processor 4.

The memory 6 stores a plurality of software applications 17. Each software application comprises code which when run by the processor 4 enables a software application. The user is able to provide input to each software application 17 by contorting portions of the apparatus. The meaning (effect) of a particular contortion (e.g. backwards bend) at a particular portion is consistent across the plurality of applications 17.

The memory 6 also stores a computer program 18 comprising computer program instructions that control the operation of the apparatus 2 when loaded into the processor 4. The computer program instructions 18 provide the logic and routines that enables the apparatus to perform, for example, disambiguation of the inputs from the sensors 12 and to consequently control the apparatus 2 in dependence upon the detected contortions The processor 2 by reading the memory 6 is able to load and execute the computer program 18.

Figure 2:
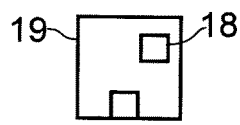
FIG. 2 schematically illustrates a delivery mechanism for a computer program.
Figure 3:
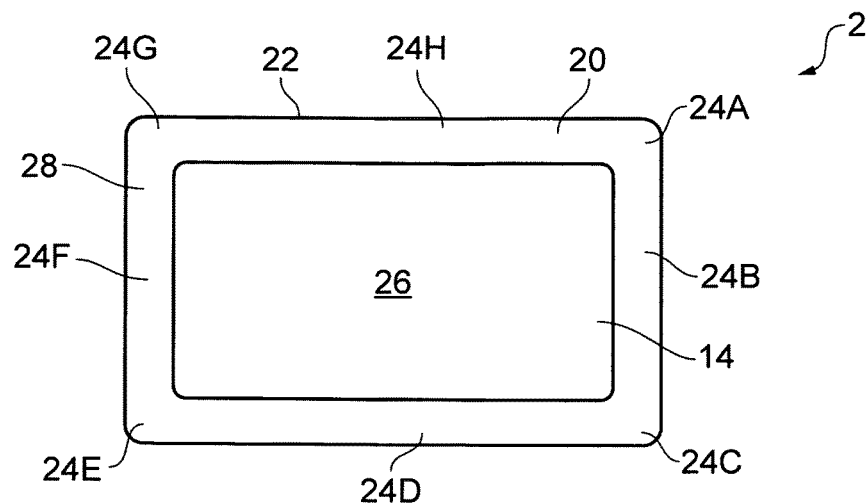
FIG. 3 illustrates one of many different examples of an apparatus.

Referring to FIG. 2, the computer program 18 may arrive at the apparatus 2 via any suitable delivery mechanism 19. The delivery mechanism 19 may be, for example, a computer-readable storage medium, a computer program product, a memory device, a record medium such as a CD-ROM or DVD, an article of manufacture that tangibly embodies the computer program 18. The delivery mechanism may be a signal configured to reliably transfer the computer program 18, such as an over-the-air radio signal. The apparatus 2 may propagate or transmit the computer program 18 as a computer data signal.

Although the memory 6 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

FIGS. 3 and 4A to 4E illustrate an example of the apparatus 2. The apparatus 2 comprises a body 20 configured for resilient contortion from a neutral equilibrium shape by a user. The body 20 has an exterior surface 28 that resiliently contorts in response to user actuation and defines at least part of an exterior surface 28 of the apparatus 2. The body may comprise a display 14 on at least a portion of the exterior surface 28 of the body 20. In this example, the display is controlled by electronic circuitry 16 (not illustrated) including at least a processor 4.

In the illustrated examples, the apparatus 2 is substantially rectangular with rounded corners and the apparatus 2 is used in a landscape orientation with the longest side of the rectangular body 20 extending between the left hand and the right hand of the user. However, different shapes of body may be used such as ellipsoid, circle, ovoid etc The body 20 has an exterior surface 28 that resiliently contorts in response to user provision of a force F.

The body 20 has a face 26 which is presented to the user. In this example, the face 26 comprises a display 14 which may be flexible. For example, the display 14 may be configured for resilient contortion and may contort as the body contorts. Suitable displays may include organic light emitting diode (OLED) displays, polymer organic light emitting diode (P-OLED) displays, light emitting polymer (LEP) displays, flexible liquid crystal displays (e.g. cholesteric liquid crystal or polymer-dispersed liquid crystal), electrophoretic displays or electrowetting displays. In other examples, the display 14 may not be present.

The face 26 has a perimeter 22 and portions 24A-24H of the exterior surface 28 of the body 20 that can be contorted for user input are positioned adjacent the perimeter 22. In this example there is a labelled portion for each edge/vertex of the rectangular face 26. However, it should be appreciated that there may be more, or less distinct portions 24. For example, every vertex and edge may not have an associated distinct portion that can be contorted for user input. For example, an edge may have more than one associated distinct portion that can be contorted for user input at different locations along its length.

In the specific illustrated example, there is a top-right corner portion 24A positioned adjacent a top-right corner of the face 26. There is a right-edge portion 24B positioned adjacent a right-edge of the face 26. There is a bottom-right corner portion 24C positioned adjacent a bottom-right corner of the face 26. There is a bottom-edge portion 24D positioned adjacent a bottom-edge of the face 26. There is a bottom-left corner portion 24E positioned adjacent a bottom-left corner of the face 26. There is a left-edge portion 24F positioned adjacent a left-edge of the face 26. There is a top-left corner portion 24G positioned adjacent a top-left corner of the face 26. There is a top-edge portion 24H positioned adjacent a top-edge of the face 26.

Figure 4A:
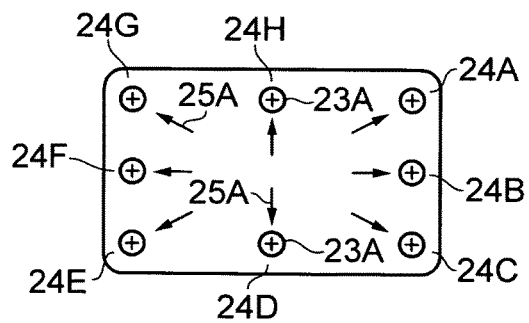
FIGS. 4A and 4B illustrate bending peripheral portions of the apparatus backwards.
Figure 4B:
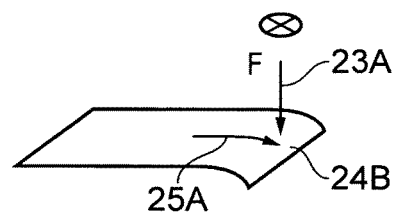

FIG. 4A illustrates that a user may provide a downward force 23A at any of the portions 24A-24H and thereby cause a backward bend 25A of the portion. This is interpreted as a user input by the electronic circuitry 16. The downward force 23A is provided by a user using the hand(s) holding the apparatus 2 without having to remove them from holding the apparatus 2. As an example, FIG. 4B illustrates user provision, using a right-hand holding the apparatus, of a downward force 23A on a front face 26 at a right-edge portion 24B which causes a backward bend 25A of the portion 24B.

Figure 4C:
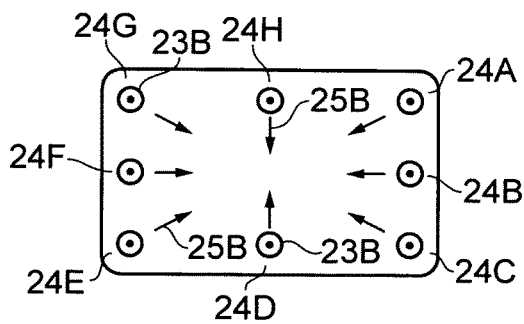
FIGS. 4C and 4D illustrate bending peripheral portions of the apparatus forwards.
Figure 4D:
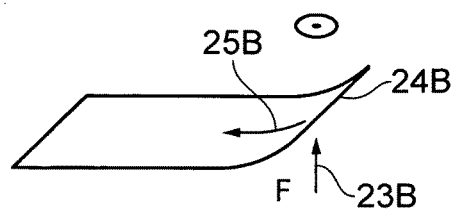

FIG. 4C illustrates that a user may provide an upward force 23B at any of the portions 24A-24H and thereby cause a forward bend 25B of the portion. This is interpreted as a user input by the electronic circuitry 16. The upward force 23B is provided by a user using the hand(s) holding the apparatus 2 without having to remove them from holding the apparatus 2. As an example, FIG. 4D illustrates user provision, using a right-hand holding the apparatus, of an upward force 23B on a rear face (not illustrated) at a right-edge portion 24B which causes a forward bend 25B of the portion 24B.

In FIGS. 4A, 4B, 4C and 4D the direction of a force is illustrated using a convention borrowed from electromagnetism. A circle with a point at its centre represents a tip of an arrow and indicates that the force is out of the page. A circle with a cross at its centre represents a tail of an arrow and indicates that the force is into the page.

In FIGS. 4A, 4B, 4C and 4D the direction of a bend is illustrated using an arrow 25 in the plane of the paper that points along a negative gradient of the surface 28. It points towards the lower local potential energy state and indicates where a ball placed on the surface 28 would roll towards.

In FIGS. 4A, and 4C each and every portion 24A24H is configured to be bent backwards and to be bent forwards. In some implementations a portion may be configured to be bent forward and not backward or configured to be bent forward and not backward.

In FIGS. 4A, and 4C bending backwards and bending forwards are used as examples of opposing contortions created using opposite forces. It should be appreciated that contortions other than bending forwards and backwards may be possible as additions or alternatives. Examples of pairs of opposing contortions may, for example, include twist clockwise or twist anti-clockwise or push-in and pull-out.

In the examples of FIGS. 4A to 4D, the electronic circuitry 16 is configured to provide consistent meaning across the plurality of different software applications 17 for backward bending of a portion 24 of the exterior surface 2. Each backward-bent portion 24A-24H may be associated with meaning or effect that remains constant or similar for each software application 17. Thus a user action, such as bending a portion 24A forward will have similar effect irrespective of which of the different software applications 17 is currently running. This provides for intuitive operation of the apparatus 2.

In the examples of FIGS. 4A to 4D, the electronic circuitry 16 is also configured to provide consistent meaning across a plurality of different software applications 17 for forward bending of a portion 24 of the exterior surface 2. Each forward-bent portion 24A-24H may be associated with meaning or effect that remains constant or similar for each software application 17. Thus a user action, such as bending a portion 24A forward will have similar effect irrespective of which of the different software applications 17 is currently running. This provides for intuitive operation of the apparatus 2.

For example, backward bending of a particular portion may provide, in each of the plurality of software applications 17, an affirmative command and backward bending of a portion opposing the particular portion may provide, in each of the plurality of applications 17, a negative command.

The particular portion may, for example, be an edge portion 24B, 24D, 24F, 24H and the opposing portion may be an edge portion 24F, 24H, 24B, 24D on the opposite side of the face 28.

The particular portion may, for example, be a corner portion 24A, 24C, 24E, 24G and the opposing portion may be a non-adjacent corner portion 24E, 24G, 24A, 24C that is diagonally opposing across the rectangular face 28.

The particular portion may, for example, be a corner portion 24A, 24C, 24E, 24G and the opposing portion may be an adjacent corner portion 24C, 24E, 24G, 24A that is opposing across an edge of the rectangular face 28.

An affirmative command may result in advancement, for example, through a menu system or in a direction determined by a location of the particular portion.

A negative command may result in retreat, for example, through a menu system or in a direction determined by a location of the opposing portion.

In some examples, forward bending of the particular portion may provide, in each of the plurality of software applications, the negative command and forward bending of the opposing portion may provide, in each of the plurality of applications, the affirmative command.

According to one embodiment, backward bending of a portion 24 may provide, in the plurality of software applications, an affirmative pre-selection navigation command consistent with a location of the portion 24. The portion 24 is located relative to an origin a centre of the face 26 along a vector and the affirmative pre-selection navigation command navigates in a direction of the vector. In some examples, forward bending of the portion may provide, in the plurality of software applications, a negative navigation command consistent with a location of the portion. The negative pre-selection navigation command navigates in a direction opposite to the vector.

The navigation commands associated with the different portions 24 may enable, in the software applications, one or more of: navigating through a hierarchical menu structure; scrolling; panning; and positioning a pointer.

For example, the following table illustrates how a user can input different navigation commands by bending different portions 24A-24H.

TABLE 1

| Portion | Bend | Navigation |
|---|---|---|
| Top edge 24H | Back | up |
| Top edge 24H | Forward | down |
| Bottom edge 24D | Back | down |
| Bottom edge 24D | Forward | up |
| Right edge 24B | Back | right |
| Right edge 24B | Forward | left |
| Left edge 24B | Back | left |
| Left edge 24B | Forward | right |
| Top-right corner 24A | Back | diagonal towards top-right |
| Top-right corner 24A | Forward | diagonal towards bottom-left (away from top-right) |
| Bottom-right corner 24C | Back | diagonal towards bottom-right |
| Bottom-right corner 24C | Forward | diagonal towards top-left (away from bottom-right) |
| Top-left corner 24G | Back | diagonal towards top-left |
| Top-left corner 24G | Forward | diagonal towards bottom-right (away from top-left) |
| Bottom-left corner 24E | Back | diagonal towards bottom-left |
| Bottom-left corner 24E | Forward | diagonal towards top-right (away from bottom-left) |

An affirmative command input by backward bending the particular portion may consistently complete an action defined by an in-use one of the software applications and a subsequent downward bend of an opposing portion may consistently provide an affirmative command that at least partially undoes the completed action.

For example, the affirmative command:

| Top edge 24H | Back | up |
|---|---|---| may be consistently undone, irrespective of software application, by the affirmative command

| Bottom edge 24D | Back | down |
|---|---|---|

An affirmative command input by backward bending the particular portion may provide the same command as a negative command input by forward bending the opposing portion.

For example, the affirmative command:

| Top edge 24H | Back | up |
|---|---|---| may be consistently the same, irrespective of software application, as the negative command

| Bottom edge 24D | Forward | up |
|---|---|---| and may be consistently opposite, irrespective of software application, as the associated affirmative command

| Bottom edge 24D | Back | down |
|---|---|---|

If a particular portion and its opposing portion are simultaneously used to provide contradictory commands, that is they are bent in the same direction, then a third meaning can be consistently assigned to this contortion that is different to the meaning consistently assigned to the particular portion when bent in that direction and different to the meaning consistently assigned to the opposing portion when bent in that direction.

For example, the affirmative command:

| Right edge 24B | Back | right |
|---|---|---| and the affirmative command

| Left edge 24F | Back | left |
|---|---|---| when performed together may provide consistently, irrespective of software application, a different command

| Right edge 24B & Left edge 24F | Both back | select or zoom-out |
|---|---|---|

For example, the negative command:

| Right edge 24B | Forward | left |
|---|---|---| and the negative command

| Left edge 24F | Forward | right |
|---|---|---| when performed together may provide consistently, irrespective of software application, a different command

| Right edge 24B & Left edge 24F | Both forward | de-select or zoom-in |
|---|---|---|

Figure 4E:
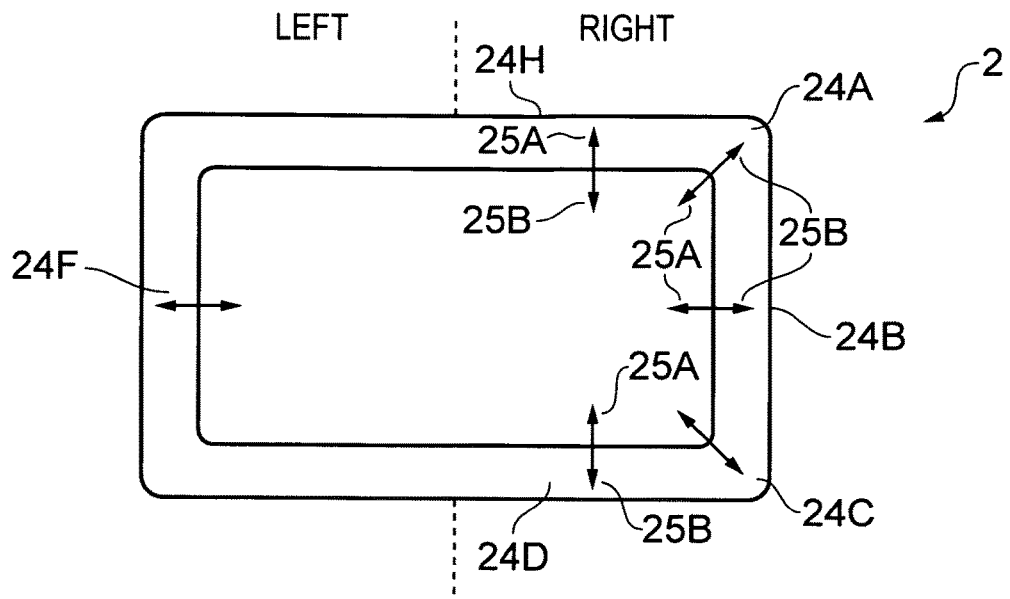
FIG. 4E illustrates an apparatus for which the peripheral portions contort differently dependent upon which side of the body the peripheral portion is located.

FIG. 4E illustrates an apparatus 2 for which the portions 24A-24H contort differently dependent upon which side of the body the portion is located. As previously described the number, location and contortions described for the portions 24A-24H are only examples.

In the illustrated example, the apparatus 2 has portions 24A, 24B, 24C, 24D and 24H on the right-hand side 31 adjacent the right-side perimeter 22 of the face 26 of the body 20. The apparatus 2 has portions 24E, 24F, 24G, on the left-hand side 33 adjacent the left-side perimeter 22 of the face 26 of the body 20.

The electronic circuitry is configured to provide a first functions in response to backward bending 25B of the right-side portions and a second different function in response to backward bending 25B of the left-side portion(s).

The right-side portions may be contorted as part of a global contortion of the whole apparatus 2. The right side portions include the top edge 24H, the bottom edge 24D and the right-side edge 24C. They may also include the top-right corner 24A and the bottom-right corner 24C.

The right-side portions may be used for pre-selection navigation control as described in the table 1 above. The right-side portions may, for example, provide the functionality of an analog joystick.

Bending down a right-side portion navigates in a direction of a vector defined by the location of that portion. For example, bending the right edge 24B back may navigate right, bending the right edge 24B forward may navigate left, bending top edge 24H back may navigate up, bending the top edge 24H forward may navigate down, bending the bottom edge 24D back may navigate down and bending the bottom edge 24D up may navigate up.

The left-side portion(s) may be contorted as part of a local contortion and not as part of a global contortion of the whole apparatus 2. The left side portion(s) include the left edge 24F. They may also include the top-left corner 24G and the bottom-left corner 24E. The left-side portion may, for example, comprise a rim contorted by bending the rim.

The left-side portion(s) may be used for post-navigation selection.

User provision of a force in a first direction to any of the right-side portions results in a first contortion of the exterior surface 28 to a different extent than user provision of the same force in the first direction to the left-side portion(s). That is the compliance of the portions may be different depending upon location.

The apparatus 2 may be rotatable such that the right-side portions are positioned for use by a user's left-hand in providing the first functions and the left-side portion(s) is positioned for use by a user's right-hand in providing the second function. For example, there may be a detector (e.g. a gyroscope or accelerometer, for example) that detects the orientation of the apparatus and adjusts output on the display accordingly and interprets input from the user via contortion of the apparatus 2 accordingly. It will, for example, be appreciate that the mappings of particular deformations to commands are inverted so that, for the deformations, 'top' exchanges with 'bottom' and 'left' exchanges with 'right' when the apparatus is rotated through 180 degrees.

Figure 5A:
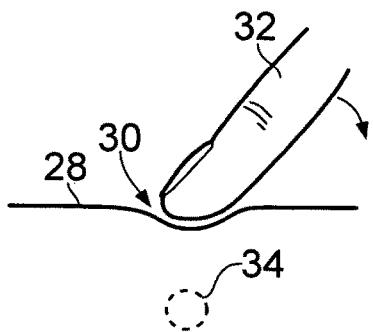
FIGS. 5A and 5B schematically illustrate an embodiment where a pivoting digit provide resilient user-deformation of the exterior surface of the body 20 which is interpreted as a joy-stick command.
Figure 5B:
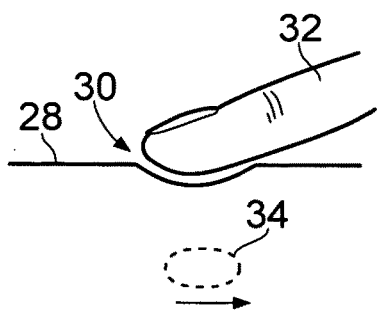
Figure 6:
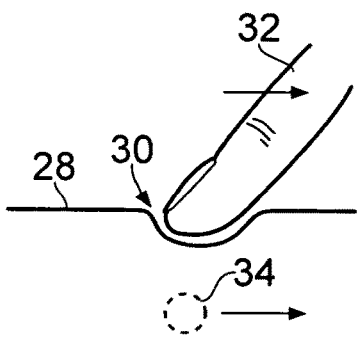
FIG. 6 schematically illustrates an embodiment where a tracing digit provides resilient user-deformation of the exterior surface of the body which is interpreted as a scrolling or browsing command.

FIGS. 5A, 5B and 6 schematically illustrate embodiments where the body 20 is configured for resilient user-deformation of the exterior surface 28 of the body 20. The body 20 may be as illustrated in FIGS. 3A to 3G and FIGS. 4A and 4B or it may be different, such as the body 20 illustrated in FIGS. 7A and 7B. The sensors 12 are configured to detect a time varying user-defined deformation of the exterior surface 28 of the body 20.

The FIGS. 5A, 5B and 6 schematically illustrate embodiments where the body 20 is configured at portions 24 for resilient user-deformation of the exterior surface 28 of the body 20 by a digit 32. The user digit contacts the exterior surface 28 of the body 20 which deforms to form a depression 30. The contact defines a contact area 34. The sensors 12 are configured to detect a motion of the contact area 34 as a user input command.

In FIGS. 5A and 5B, the user pivots the digit 32 about its point of contact. As the digit pivots downwards reducing the contact angle between the digit and the exterior surface 28, the contact area 34 changes shape and typically increases in size. The sensors 12 are configured to detect a dynamic change in the contact area and interpret it as an input joy-stick command where the digit 32 is the joy-stick.

In FIG. 6, the user traces the digit 32 along the exterior surface 28 while still creating the depression 30. As the digit moves the contact area 34 changes position. The sensors 12 are configured to detect a dynamic change in the position of the contact area 34 and interpret it as an input scrolling or browsing command.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
    a body configured for resilient contortion from a neutral equilibrium shape by a user, the body having an exterior surface that resiliently contorts in response to user provision of a force, wherein the body defines, proximal to a perimeter of a face of the body:
        at least a first portion of an exterior surface of the apparatus, wherein the first portion is displaced relative to an origin along a first vector;
        a second portion of the exterior surface of the apparatus that opposes the first portion across the face, wherein the second portion is separated from the first portion in at least a first dimension, wherein the second portion is displaced relative to the origin along a second vector; and
        a third portion of the exterior surface of the apparatus, between the first portion and the second portion in the first dimension, wherein the third portion is displaced relative to the origin along a third vector, wherein the third vector comprises a vector component that is orthogonal to a vector component of the first vector and to a vector component of the second vector,
    wherein user provision of a force in a first direction results in a first contortion of the exterior surface and user provision of a force in a second direction, opposite to the first direction, results in a second contortion of the exterior surface; and electronic circuitry including at least a processor configured to provide:
a first consistent meaning with respect to a first function across a plurality of different software applications to navigate in a direction of the first vector for user provision of a force in the first direction contorting the first portion of the exterior surface;
a second, different consistent meaning with respect to the first function across the plurality of different software applications to navigate in a direction of the second vector for user provision of a force in the first direction contorting the second portion of the exterior surface;
a third, different consistent meaning with respect to the first function across the plurality of different software applications to navigate in a direction of the third vector for user provision of a force in the first direction contorting the third portion of the exterior surface; and
a fourth, different consistent meaning with respect to a second function, different to the first function, across the plurality of different software applications in response to simultaneous user provision of a force in the first direction contorting the first portion of the exterior surface and a force in the first direction contorting the second portion of the exterior surface, wherein the first function is a navigation function and the second function is a non-navigation function.

2. The apparatus as claimed in claim 1, wherein a first contortion of the first portion provides, in the plurality of different software applications, a command for advancement and wherein a first contortion of the second portion provides, in the plurality of different software applications, a command for retreat.

3. The apparatus as claimed in claim 1, wherein a first contortion of the first portion provides, in the plurality of different software applications, a navigation command consistent with a location of the first portion and wherein a first contortion of the second portion provides, in the plurality of different software applications, a navigation command consistent with a location of the second portion and wherein a first contortion of the third portion provides, in the plurality of different software applications, a navigation command consistent with a location of the third portion.

4. The apparatus as claimed in claim 3, wherein the navigation commands enable, in the software applications, one or more of:
navigating through a hierarchical menu structure;
scrolling;
panning; and
positioning a pointer.

5. The apparatus as claimed in claim 1, wherein a first contortion of the first portion without contortion of the second portion consistently provides, in the plurality of different software applications, a command that completes an action defined by an in-use one of the software applications and a subsequent first contortion of the second portion without contortion of the first portion consistently provides a command that at least partially undoes the completed action.

6. The apparatus as claimed in claim 1, wherein user provision of a force in the first direction to the first portion of the exterior surface results in a backward bending of the first portion;
wherein user provision of a force in the first direction to the second portion of the exterior surface results in a backward bending of the second portion;
wherein user provision of a force in the second direction to the first portion of the exterior surface results in a forward bending of the first portion; and
wherein user provision of a force in the second direction to the second portion of the exterior surface results in a forward bending of the second portion.

7. The apparatus as claimed in claim 1, wherein the electronic circuitry is configured to provide consistent meaning across the plurality of different software applications for user provision of a force in the second direction to the first portion of the exterior surface and to provide consistent meaning across the plurality of different software applications for user provision of a force in the second direction to the second portion of the exterior surface.

8. The apparatus as claimed in claim 1, wherein the electronic circuitry is configured to provide consistently a common meaning across the plurality of different software applications for user provision of a force in the first direction to the first portion of the exterior surface and user provision of a force in the second direction to the second portion of the exterior surface.

9. The apparatus as claimed in claim 1, wherein the electronic circuitry is configured to provide consistent meaning with respect to the second function across the plurality of different software applications for simultaneous user provision of a force in the first direction to the first portion of the exterior surface and a force in the first direction to the second portion of the exterior surface and to provide consistent meaning with respect to the second function across the plurality of different software applications for simultaneous user provision of a force in the second direction to the first portion of the exterior surface and a force in the second direction to the second portion of the exterior surface.

10. The apparatus as claimed in claim 1, wherein the consistent meaning across the plurality of different software applications for simultaneous user provision of a force in the first direction to the first portion of the exterior surface and a force in the first direction to the second portion of the exterior surface is different to the consistent meaning across the plurality of different software applications for user provision of a force in the first direction only to the first portion of the exterior surface;
the consistent meaning across the plurality of different software applications for user provision of a force in the first direction only to the second portion of the exterior surface;
the consistent meaning across the plurality of different software applications for user provision of a force in the second direction only to the first portion of the exterior surface; and
the consistent meaning across the plurality of different software applications for user provision of a force in the second direction only to the second portion of the exterior surface.

11. The apparatus as claimed in claim 10, wherein the consistent meaning across the plurality of different software applications for simultaneous user provision of a force in the first direction to the first portion of the exterior surface and a force in the first direction to the second portion of the exterior surface is selection.

12. The apparatus as claimed in claim 11, wherein the consistent meaning across the plurality of different software applications for user provision of a force in the first direction to the first portion of the exterior surface, the consistent meaning across the plurality of different software applications for user provision of a force in the first direction to the second portion of the exterior surface, the consistent meaning across the plurality of different software applications for user provision of a force in the second direction to the first portion of the exterior surface, and the consistent meaning across the plurality of different software applications for user provision of a force in the second direction to the second portion of the exterior surface is pre-selection navigation.

13. The apparatus as claimed in claim 1, wherein bending a right or left side of the perimeter provides a consistent meaning with respect to the first navigation function, and wherein bending a bottom or top side of the perimeter provides a consistent meaning with respect to a second navigation function.

14. The apparatus as claimed in claim 1 sized as a hand-portable apparatus.

15. The apparatus as claimed in claim 1 wherein the exterior surface of the body is configured to resiliently contort in response to user provision of a force, wherein a first side and a second side of the face of the body contort differently in response to receiving a same force;
  wherein the body defines, proximal to a first portion of a perimeter of the first side of the face of the body, first portions of the exterior surface of the apparatus and defines, proximal to a second portion of the perimeter of the second side of the face of the body, at least a second portion of the exterior surface of the apparatus, wherein at least one of the first portions is defined, at least in part, by a first peripheral edge of the apparatus at the first side of the face of the body, wherein the second portion is defined, at least in part, by a second peripheral edge of the apparatus at the second side of the face of the body, wherein the second peripheral edge extends at least partially in a same direction as the first peripheral edge;
  wherein user provision of a force at the first peripheral edge in a first direction to any of the first portions results in a contortion of the exterior surface to a different extent than user provision of the same force at the second peripheral edge in the first direction to the second portion; and
  wherein the electronic circuitry is configured to provide different functions in response to user provision of a force in a first direction to the first portions and user provision of the same force in the first direction to the second portion.

16. An apparatus comprising:
  a body configured for resilient contortion from a neutral equilibrium shape by a user, the body having an exterior surface that resiliently contorts in response to user provision of a force wherein a first side and a second side of a face of the body have different compliances such that the first side and the second side contort differently in response to receiving a same force;
  wherein the body defines, proximal to a first portion of a perimeter of the first side of the face of the body, first portions of an exterior surface of the apparatus and defines, proximal to a second portion of the perimeter of the second side of the face of the body, at least a second portion of an exterior surface of the apparatus, wherein at least one of the first portions is defined, at least in part, by a first peripheral edge of the apparatus at the first side of the face of the body, wherein one of the first portions is displaced relative to an origin along a first vector, wherein another of the first portions is displaced relative to the origin along a second vector, wherein a further one of the first portions is displaced relative to the origin along a third vector, wherein the second portion is defined, at least in part, by a second peripheral edge of the apparatus at the second side of the face of the body, wherein the second peripheral edge extends at least partially in a same direction as the first peripheral edge;
  wherein user provision of a force at the first peripheral edge in a first direction to any of the first portions results in a first contortion of the exterior surface to a different extent than user provision of the same force at the second peripheral edge in the first direction to the second portion; and
  electronic circuitry including at least a processor configured to provide a first function in response to user provision of a force in the first direction to the first portions and to provide a second function in response to user provision of the same force in the first direction to the second portion, wherein user provision of a force in the first direction to the one of the first portions navigates in a direction of the first vector, wherein user provision of a force in the first direction to the another of the first portions navigates in a direction of the second vector, wherein user provision of a force in the first direction to the further one of the first portions navigates in the direction of the third vector, wherein the third vector comprises a vector component that is orthogonal to a vector component of the first vector and to a vector component of the second vector.

17. The apparatus as claimed in claim 16, wherein the first portions are positioned for use by a user's right-hand in providing the first function and the second portion is positioned for use by a user's left-hand in providing the second function.

18. The apparatus as claimed in claim 17, wherein the apparatus is rotatable such that the first portions are positioned for use by the user's left-hand in providing the first function and the second portion is positioned for use by the user's right-hand in providing the second function.

19. The apparatus as claimed in claim 16, wherein the first portions include a side edge, wherein the side edge is a right edge and bending the right edge back navigates right and bending the right edge forward navigates left.

20. An apparatus comprising:
  a body configured for resilient contortion from a neutral equilibrium shape, the body having an exterior surface that resiliently contorts in response to provision of a force, wherein the body defines, proximal to a perimeter of a face of the body:
    at least a first portion of an exterior surface of the apparatus, wherein the first portion is displaced relative to an origin along a first vector;
    a second portion of the exterior surface of the apparatus that opposes the first portion across the face, wherein the second portion is separated from the first portion in at least a first dimension, wherein the second portion is displaced relative to the origin along a second vector; and
    a third portion of the exterior surface of the apparatus, between the first portion and the second portion in the first dimension, wherein the third portion is displaced relative to the origin along a third vector, wherein the third vector comprises a vector component that is orthogonal to a vector component of the first vector and to a vector component of the second vector;
  wherein provision of a force in a first direction results in a first contortion of the exterior surface and provision of a force in a second direction, opposite to the first direction, results in a second contortion of the exterior surface; and electronic circuitry including at least a processor configured to provide:
- a first consistent meaning with respect to a first function across a plurality of different software applications to navigate in a direction of the first vector for provision of a force in the first direction contorting the first portion of the exterior surface;
- a second, different consistent meaning with respect to the first function across the plurality of different software applications to navigate in a direction of the second vector for provision of a force in the first direction contorting the second portion of the exterior surface;
- a third, different consistent meaning with respect to the first function across the plurality of different software applications to navigate in a direction of the third vector for provision of a force in the first direction contorting the third portion of the exterior surface; and
- a fourth, different consistent meaning with respect to a second function, different to the first function, across the plurality of different software applications in response to simultaneous provision of a force in the first direction contorting the first portion of the exterior surface and a force in the first direction contorting the second portion of the exterior surface, wherein the first function is a navigation function and the second function is a non-navigation function.

21. The apparatus as claimed in claim 1, wherein the first function is pre-selection navigation, and wherein the second function is selection or zoom.

22. The apparatus as claimed in claim 1, wherein an edge of the face between two adjacent corners of the face defines, at least in part, the first portion, the second portion and the third portion.

* * * * *

UNITED STATES PATENT AND TRADEMARK OFFICE
CERTIFICATE OF CORRECTION

PATENT NO. : 9,823,707 B2
APPLICATION NO. : 13/357809
DATED : November 21, 2017
INVENTOR(S) : Pii Susanna Paasovaara, Johan Kildal and Erika Reponen It is certified that error appears in the above-identified patent and that said Letters Patent is hereby corrected as shown below:

In Claim 16:
Column 13, Line 50, "ofa" should be deleted and --of a-- should be inserted.

Signed and Sealed this
Tenth Day of July, 2018

Andrei Iancu
*Director of the United States Patent and Trademark Office*